US008952636B2

United States Patent
Tateda et al.

(10) Patent No.: US 8,952,636 B2
(45) Date of Patent: Feb. 10, 2015

(54) DATA COMMUNICATION DEVICE THAT CARRIES OUT SERIAL COMMUNICATION IN ORDER TO CONTROL MOTOR

(71) Applicant: Fanuc Corporation, Minamitsuru-gun, Yamanshi (JP)

(72) Inventors: Masaya Tateda, Yamanashi (JP); Hiroyasu Sato, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/975,794

(22) Filed: Aug. 26, 2013

(65) Prior Publication Data

US 2014/0056338 A1     Feb. 27, 2014

(30) Foreign Application Priority Data

Aug. 27, 2012   (JP) .................................. 2012-187016

(51) Int. Cl.
*H02P 1/54*     (2006.01)
*H04B 1/40*     (2006.01)

(52) U.S. Cl.
CPC ......................................... *H04B 1/40* (2013.01)
USPC .................... 318/34; 318/400.13; 318/400.25; 318/449

(58) Field of Classification Search
USPC ........ 318/34, 62, 162, 400.1, 400.13, 400.25, 318/400.26, 722, 245, 445, 449, 484
See application file for complete search history.

(56) References Cited

U.S. PATENT DOCUMENTS

| 6,806,663 | B2 * | 10/2004 | Kusaka et al. ............ 318/400.17 |
| 6,998,801 | B2 * | 2/2006 | Kurosawa et al. ....... 318/400.27 |
| 7,224,138 | B2 * | 5/2007 | DeCusatis et al. ............. 318/606 |
| 7,952,317 | B2 * | 5/2011 | Suh ................................ 318/801 |
| 8,089,232 | B2 * | 1/2012 | Itagaki et al. ............ 318/400.11 |

FOREIGN PATENT DOCUMENTS

| JP | 8274742 A | 10/1996 |
| JP | 2006020374 A | 1/2006 |
| JP | 2008-244884 A | 10/2008 |
| JP | 2010088186 A | 4/2010 |
| JP | 2010156661 A | 7/2010 |

* cited by examiner

*Primary Examiner* — Bentsu Ro
*Assistant Examiner* — Thai Dinh
(74) *Attorney, Agent, or Firm* — Lowe Hauptman & Ham

(57) ABSTRACT

A data reception unit carries out reception of data, which consists of a combination of switching noise resistant states and switching noise nonresistant states, over a fixed serial communication time a plurality of times for each fixed serial communication period same as the one or a plurality of the switching periods. A serial communication time setting unit sets the serial communication time different from one or a plurality of the switching periods, based on the switching period, the serial communication period, and the communication speed of the data communication device, so that the starts of all of the switching periods within the serial communication time are consistent with the time of reception of the switching noise resistant state at the time of at least one of the reception of the data among a plurality of times of the reception of the data.

4 Claims, 7 Drawing Sheets

DATA COMMUNICATION DEVICE THAT CARRIES OUT SERIAL COMMUNICATION IN ORDER TO CONTROL MOTOR

BACKGROUND OF THE INVENTION

1. Field of the Invention

The present invention relates to a data communication device that carries out serial communication in order to control a motor, which is connected via an inverter to a DC link part connected to an alternating-current power source via a converter, by carrying out switching of a switching element included in either the converter or the inverter for each fixed switching period, from the time when the preparation of driving the motor is completed to the time when the motor is stopped.

2. Description of Related Art

A data communication device, which functions a master device or a slave device that carries out serial communication in order to control a motor in a system, which includes motors to drive a feed axis and a main axis of a machine tool, an industrial robot arm, etc., is proposed.

In such a system which includes the motors, the master device is implemented by a converter control device configured to control a converter in order to convert alternating-current power supplied from an alternating-current power source into direct-current power, an upper control device such as a CNC (computer numerical control), etc., and the slave device is implemented by an inverter control device configured to control an inverter in order to convert the direct-current power which is converted by a converter into alternating-current power, etc. For example, in the case where the master device is the converter control device and the slave device is the inverter control device, data such as status information, alarm information, etc., is shared between the converter control device and the inverter control device by carrying out data transmission and reception via a serial communication bus. In the case where the master device is the upper control device and the slave device is the inverter control device, data such as motor position or speed command data of, etc., is transmitted from the upper control device to the inverter control device via the serial communication bus and data such as current value data, motor position or speed data, etc., is transmitted from the inverter control device to the upper control device via the serial communication bus, thereby the data is shared between the converter control device and the inverter control device.

A serial communication among a plurality of devices can transmit and receive an amount of data larger than the amount of data that can be transmitted and received by parallel communication with electric lines in a number smaller than the number of electric lines used for the parallel communication (for example, two electric lines are used in the case of I²C communication).

When controlling a motor, there is a possibility that an anomaly may occur in data transmitted or received by the master device or the slave device due to switching noise caused by switching of a switching element, which is included in an equipment (for example, inverter) controlled by at least one of a master device and a slave device, for each fixed switching period, from the time when the preparation of driving the motor is completed to the time when the motor is stopped.

A data communication device, which avoids the influence of the switching noise by detecting the switching of a switching element and displacing the timing to transfer data from an encoder from the time of switching of the switching element in order to avoid the influence of the switching noise on the data transmitted or received by the master device or the slave device, is proposed in, for example, Japanese Unexamined Patent Publication (Kokai) No. 2006-20374 (JP2006-20374A), and a data communication device, which avoids the influence of the switching noise by detecting the switching of the switching element and temporarily suspending the system clock at the time of switching of the switching element in order not to transmit or receive data, is proposed in, for example, Japanese Unexamined Patent Publication (Kokai) No. 2010-88186 (JP2010-88186A).

However, in the conventional data communication device, it is necessary to use a dedicated switching detection circuit in order to detect the switching of the switching element, and therefore the cost of the data communication device increases.

SUMMARY OF THE INVENTION

As an aspect of the present invention, there is provided a data communication device capable of avoiding the influence of the switching noise without using the switching detection circuit.

According to an aspect of the present invention, the data communication device that carries out serial communication in order to control a motor, which is connected via an inverter to a DC link part connected to an alternating-current power source via a converter, by carrying out switching of a switching element included in either the converter or the inverter for each fixed switching period, from the time when the preparation of driving the motor is completed to the time when the motor is stopped, includes: a data transmission unit configured to carry out transmission of first data, which consists of a combination of a first number of switching noise resistant states and a second number of switching noise nonresistant states, over a fixed serial communication time at least once for each fixed serial communication period same as the one or a plurality of the switching periods; a data reception unit configured to carry out reception of second data, which consists of a combination of a third number of switching noise resistant states and a fourth number of switching noise nonresistant states, over the fixed serial communication time a plurality of times for each fixed serial communication period; a serial communication time setting unit configured to set the serial communication time different from the time, which is the same as one or a plurality of the switching periods, based on the switching period, the serial communication period, and the communication speed of the data communication device, so that the start of the serial communication time is after the start of the switching period and the end of the serial communication time is before the start of the next switching period or so that the starts of all of the switching periods within the serial communication time are consistent with the time of reception of the switching noise resistant state at the time of at least one of the receptions of the second data among a plurality of times of the receptions of the second data; and a data taking-in determination unit configured to determine which of a plurality of pieces of the second data received by the data reception unit is to be taken into the data communication device, based on the influence of the switching noise on the second data.

Preferably, the serial communication time setting unit sets the serial communication time to a time less than half the serial communication period, and the data communication device further comprises a serial communication time start setting unit configured to set the start of the serial communication time of the second data, which is received by the data reception unit at the reception of the second data of a second time or later among the plurality of the receptions of the second data, immediately after the end of the serial communication time of the second data received immediately before the reception of the second data of the second time or later.

Preferably, the serial communication time setting unit sets the serial communication time to a time less than ⅓ of the serial communication period, and the data communication device according to the present invention further has a serial communication time start setting unit configured to set the start of the serial communication time of the second data, which is received by the data reception unit at the reception of the second data of a second time or later among the plurality of the receptions of the second data, immediately after an elapse of the time, which corresponds to one or more intervals of the serial communication time, from the end of the serial communication time of the second data received immediately before the reception of the second data of the second time or later.

Preferably, the data communication device according to the present invention further has a data transmission determination unit configured to determine whether or not to transmit the first data based on the influence of switching noise on the first data.

According to an aspect of the present invention, it is possible to avoid the influence of switching the noise without using the switching detection circuit.

BRIEF DESCRIPTION OF THE DRAWINGS

The objects, features, and advantages of the present invention will be clear based on the descriptions in the following embodiments relating to the accompanying drawings. In the drawings.

DETAILED DESCRIPTION

Figure 1:
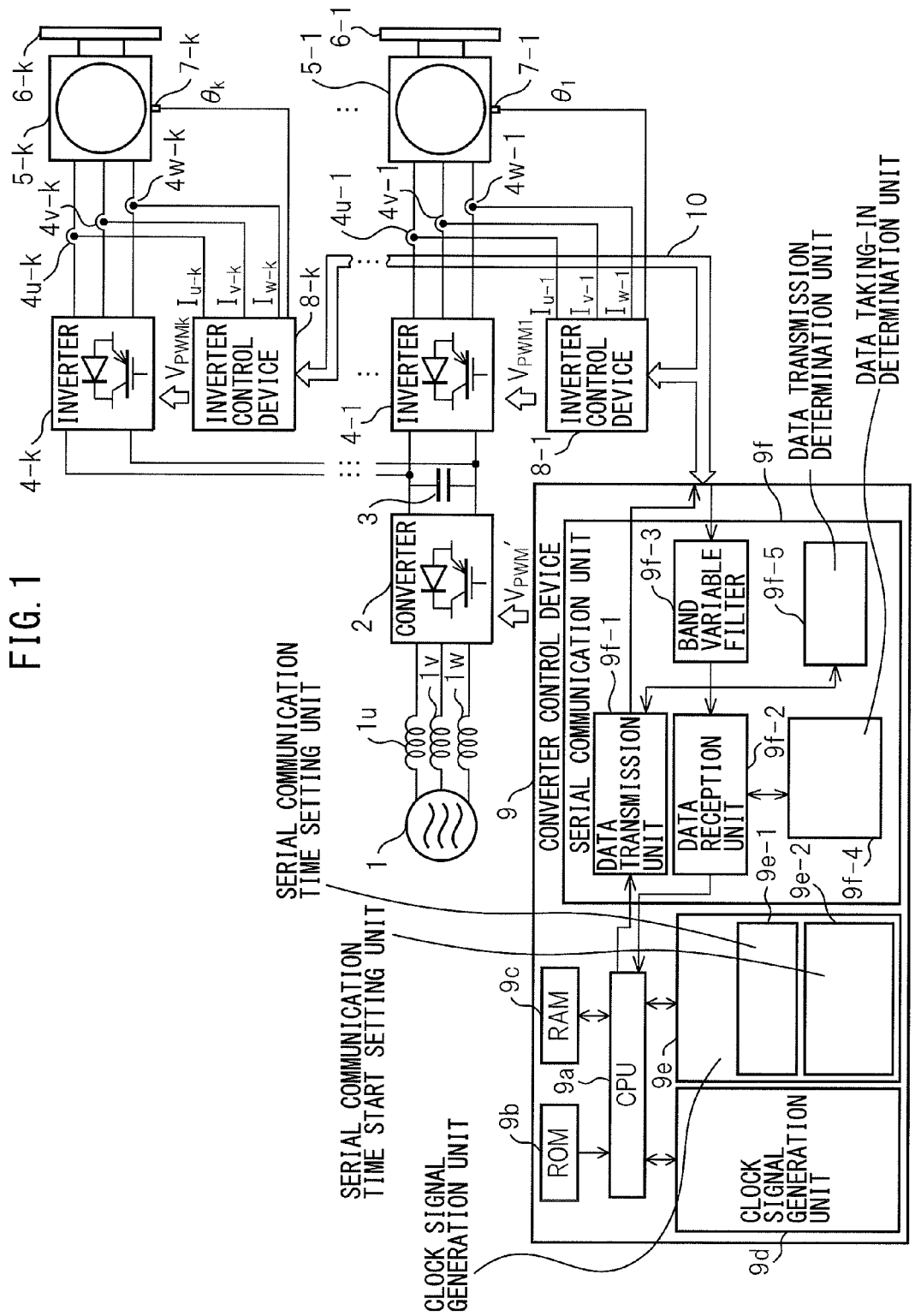
FIG. 1 is a block diagram of a system to which a data communication device according to the present invention is applied in order to control motors.

Embodiments of the data communication device according to the present invention are explained with reference to the drawings. In the drawings, the same symbols are attached to the same components.

Referring to the drawings, FIG. 1 is a block diagram of a system to which the data communication device according to the present invention is applied in order to control motors. The system shown in FIG. 1 is used in a machine tool and has a three-phase alternating-current power source 1 as an alternating-current power source, a converter 2, a smoothing capacitor 3 as a DC link part, the number "k" (k is an integer not less than 1) of inverters 4-1, . . . , 4-k, the number k of motors 5-1, . . . , 5-k, the number k of driven objects 6-1, . . . , 6-k, the number k of rotation angle detection units 7-1, . . . , 7-k, the number k of inverter control devices 8-1, . . . , 8-k as slave devices, and a converter control device 9 as a master device, which corresponds to the data communication device according to the present invention.

In the system shown in FIG. 1, data transmission and reception of data such as motor status information, alarm information, etc., between the converter control device 9 and the inverter control devices 8-1, . . . , 8-k are carried out via a serial communication bus 10 (for example, I$^2$C communication bus) in order to control the motors 5-1, . . . , 5-k.

The converter 2 consists of a plurality (six, in the case of three-phase alternating current) of rectifier diodes and transistors as switching elements connected in inverse parallel to the rectifier diodes, respectively, for example, and converts alternating-current power supplied from the three-phase alternating-current power source 1 into direct-current power. The smoothing capacitor 3 is connected in parallel to the converter 2 in order to smooth a voltage rectified by the rectifier diode of the converter 2. Each of the inverters 4-1, . . . , 4-k is connected in parallel to the smoothing capacitor 3, consists of a plurality (six, in the case of three-phase alternating current) of rectifier diodes and transistors connected in inverse parallel to the rectifier diodes, respectively, for example, and converts the direct-current power into which converted by the converter 2 into alternating-current power by turning on and off the transistor based on PWM signals $V_{PWM1}, \ldots, V_{PWMk}$, to be explained later.

The motors 5-1, . . . , 5-k are driven by power stored in the smoothing capacitor 3. As the motors 5-1, . . . , 5-k, a gravity axis servo motor configured to drive the main axis of a machine tool in the gravity axis direction (Z-axis direction) by a feed screw mechanism, such as a ball screw and nut mechanism, a main axis motor configured to drive a tool attached to the main axis of a machine tool, a horizontal axis servo motor configured to drive a table of a machine tool to which a work is attached in the horizontal axis direction (for example, X-axis direction) by a feed screw mechanism, such as a ball screw and nut mechanism, etc., is used.

The driven objects 6-1, . . . , 6-k are driven by the motors 5-1, . . . , 5-k, respectively. For example, in the case where k=3 and the motors 5-1, . . . , 5-k are the gravity axis servo motor, the main axis motor, and the horizontal axis servo motor, respectively, the driven objects 6-1, . . . , 6-k are the main axis of the machine tool, the tool, and the table of the machine tool.

The rotation angle detection units 7-1, . . . , 7-k consist of rotary encoders configured to detect rotation angles $\theta_1, \ldots, \theta_k$ of the motors 5-1, . . . , 5-k as the positions or speeds of the motors, respectively.

The inverter control devices 8-1, . . . , 8-k sample current values of three phases of U-phase currents $I_{U-1}, \ldots, I_{U-k}$, V-phase currents $I_{V-1}, \ldots, I_{V-k}$, and W-phase currents $I_{W-1}, \ldots, I_{W-k}$, respectively, detected by current detection units 4u-1; 4v-1; 4w-1, . . . , 4u-k; 4v-k; 4w-k provided in the output lines of the inverters 4-1, . . . , 4-k, respectively, as current value data of the motors 5-1, . . . , 5-k, respectively, and sample the rotation angles $\theta_1, \ldots, \theta_n$, respectively, as position or speed data of the motors in order to control the inverters 4-1, . . . , 4-k, respectively.

Then, the inverter control devices 8-1, . . . , 8-k generate the PWM signals $V_{PWM1}, \ldots, V_{PWMk}$ to drive the motors 5-1, . . . , 5-k, respectively, based on the sampled current value data and position or speed data of the motors, and position or speed command data of the motors from an upper control device, not shown schematically for simplification.

The current detection units 4u-1; 4v-1; 4w-1, . . . , 4u-k; 4v-k; 4w-k consist of, for example, hole elements, respectively, and the upper control device, not shown schematically, consists of, for example, a CNC (computer numerical control).

In the system shown in FIG. 1, the upper control device, not shown schematically, outputs an alternating-current power source regeneration command signal to the converter control device 9 in order to carry out alternating-current power source regeneration to return regenerative energy generated during speed reduction of the motors 5-1, . . . , 5-k to the three-phase alternating-current power source 1 side.

In this case, the upper control device, not shown schematically, outputs the position or speed command data corresponding to a PWM signal $V_{PWM}$ to the inverter control devices 8-1, . . . , 8-k, respectively, in order for the inverter control devices 8-1, . . . , 8-k to control the turning on and off of the transistors of the inverters 4-1, . . . , 4-k by outputting the PWM signals $V_{PWM1}$, . . . , $V_{PWMk}$ to the inverters 4-1, . . . , 4-k, respectively.

The converter control device 9 carries out serial communication in order to control switching of the transistor included in the converter 2 for each fixed switching period, from the time when the preparation of driving the motor 5-1, . . . , 5-k is completed to the time when the motor 5-1, . . . , 5-k are stopped. To do this, the converter control device 9 generates a PWM signal $V_{PWM}'$ based on the alternating-current power source regeneration command signal and outputs the PWM signal $V_{PWM}'$ to the converter 2 in order to carry out alternating-current power source regeneration. Further, in the system shown in FIG. 1, reactors 1u, 1v, and 1w are arranged between the three-phase alternating-current power source 1 and the converter 2 in order to carry out the alternating-current power source regeneration.

The converter control device 9 has a CPU 9a, a ROM 9b, a RAM 9c, a clock signal generation unit 9d, a clock signal generation unit 9e, and a serial communication unit 9f. The CPU 9a executes programs to carry out various kinds of operation. The ROM 9b stores the programs and various kinds of data relating to the performance, etc., of the converter control device 9 in advance. The RAM 9c temporarily stores data of the result of calculation by the CPU 9a, data such as motor status information, which is transmitted from the inverter control devices 8-1, . . . , 8-k via the serial communication bus 10, and data from the upper control device, not shown schematically.

The clock signal generation unit 9d generates a first serial clock, which corresponds to a fixed switching period to be set as a period during which the transistor included in the converter 2 carries out the switching operation and a fixed data communication period to be set as a period during which the converter control device 9 carries out transmission and reception of data. Then, the clock signal generation unit 9d outputs the generated first serial clock to the CPU 9a. To do this, the clock signal generation unit 9d consists of an oscillation element, an oscillation circuit, etc. Both the switching period and the serial communication period are set based on the first serial clock, and therefore, the serial communication period has the same length of time as one or a plurality of switching periods, and the start of the serial communication period is consistent with the start of any switching period.

The clock signal generation unit 9e generates a second serial clock, which corresponds to the serial communication time necessary for the converter control device 9 to carry out one time serial communication (transmission and reception of data). Then the clock signal generation unit 9e outputs the second serial clock signal to the CPU 9a, from the time when the control device 9 is activated to the time when the preparation of driving the motor 5-1, . . . , 5-k is completed. Whether or not the preparation of driving the motor 5-1, . . . , 5-k has is completed is determined by, the CPU 9a, which determines that all of the data necessary to drive the motors 5-1, . . . , 5-k are transmitted and received between the converter control device 9 and the inverter control devices 8-1, . . . , 8-k via the serial communication bus 10, for example. To do this, the clock signal generation unit 9e consists of an oscillation element, an oscillation circuit, a baud rate setting register, a baud rate generator, etc. The clock frequency of the second serial clock is different from the clock frequency of the first serial clock.

In the system shown in FIG. 1, power is supplied from a power source, not shown schematically, to the converter control device 9, the converter control device 9 enters the activated state at the same time as when the supply of power from the power source, not shown schematically, is started, and the converter control device 9 stops the operation thereof at the same time as when the supply of the power from the power source, not shown schematically, is stopped. Further, in the system shown in FIG. 1, the motors 5-1, . . . , 5-k are driven after the preparation completion of the drive of the motor 5-1, . . . , 5-k, and the motors 5-1, . . . , 5-k are stopped, based on the command from the upper control device, not shown schematically.

The serial communication unit 9f carries out the serial communication among the converter control device 9 and the inverter control devices 8-1, . . . , 8-k via the serial communication bus 10. To do this, the serial communication unit 9f has a data transmission unit 9f-1, a data reception unit 9f-2, a band variable filter 9f-3, a data taking-in determination unit 9f-4, and a data transmission determination unit 9f-5.

The data transmission unit 9f-1 transmits data (first data) such as the alarm information to the inverter control devices 8-1, . . . , 8-k via the serial communication bus 10. In the present embodiment, the data, which is transmitted from the data transmission unit 9f-1 to the inverter control devices 8-1, . . . , 8-k, consists of a combination of a number a as a first number of any one or both of fall edges and low signals (switching noise resistant state where there is no influence of switching noise because of low impedance) and a number "b" as a second number of any one or both of rising edges and high signals (switching noise nonresistant state where there is an influence of switching noise because of high impedance), and the data transmission unit 9f-1 carries out the data transmission over the serial communication time at least one time for each serial communication period.

The data reception unit 9f-2 receives data (second data) such as the motor status information from the inverter control devices 8-1, . . . , 8-k via the serial communication bus 10 and the band variable filter 9f-3. In the present embodiment, the data, which is received by the data reception unit 9f-2 from the inverter control devices 8-1, . . . , 8-k, consists of a combination of a number "c" as a third number of any one or both of fall edges and low signals (the switching noise resistant state) and a number "d" as a fourth number of any one or both of rising edges and high signals (the switching noise nonresistant state), and the data reception unit 9f-2 carries out the data reception over the serial communication time a plurality of times for each serial communication period. The band variable filter 9f-3 filters the data received from the inverters control devices 8-1, . . . , 8-k via the serial communication bus 10.

The data taking-in determination unit 9f-4 determines which of the plurality of pieces of data received by the data reception unit 9f-2 is taken in to the data communication device, i.e., the RAM 9c, based on the influence of the switching noise on the data received by the data reception unit 9f-2.

In the present embodiment, the data taking-in determination unit 9f-4 determines the influence of the switching noise by determining whether or not data is erroneous using a known error detection method (for example, cyclic redundancy check (CRC)), and takes in only the data, which is determined to not be erroneous, to the RAM 9c.

The data transmission determination unit 9f-5 determines whether or not the data is transmitted to the inverter control devices 8-1, . . . , 8-k, based on the influence of the switching noise on the data, which is intended to be transmitted by the data transmission unit 9f-1. In the present embodiment, the data transmission determination unit 9f-5 determines the influence of switching noise by determining whether or not the data is erroneous using the known error detection method and causes the data transmission unit 9f-1 to transmit only the data, which is determined to not be erroneous.

In the system shown in FIG. 1, the clock signal generation unit 9e has a serial communication time setting unit 9e-1 and a serial communication time start setting unit 9e-2. The serial communication time setting unit 9e-1 sets the serial communication time different from the time, which is the same as one or a plurality of the switching periods, based on the switching period, the serial communication period, and the communication speed of the data communication device, so that the start of the serial communication time is after the start of the switching period and the end of the serial communication time is before the start of the next switching period or so that the starts of all of the switching periods within the serial communication time are consistent with the time of reception of the switching noise resistant state at the time of at least one of the receptions of the data by the data reception unit 9f-2 among a plurality of times of the receptions of the data by the data reception unit 9f-2. As described above, the serial communication time is different from the time, which is the same as one or a plurality of switching periods, and therefore, the starts of most of the serial communication times are not consistent with the start of the switching period. The serial communication time start setting unit 9e-2 sets a start of the serial communication time of data, which is received by the data reception unit 9f-2 at the second time or later. In the present embodiment, the start of the serial communication time of the data, which is received by the data reception unit 9f-2 at the second time or later, is consistent with the start of the serial communication time of the data, which is transmitted by the data transmission unit 9f-1 at the second time or later.

Figure 2:
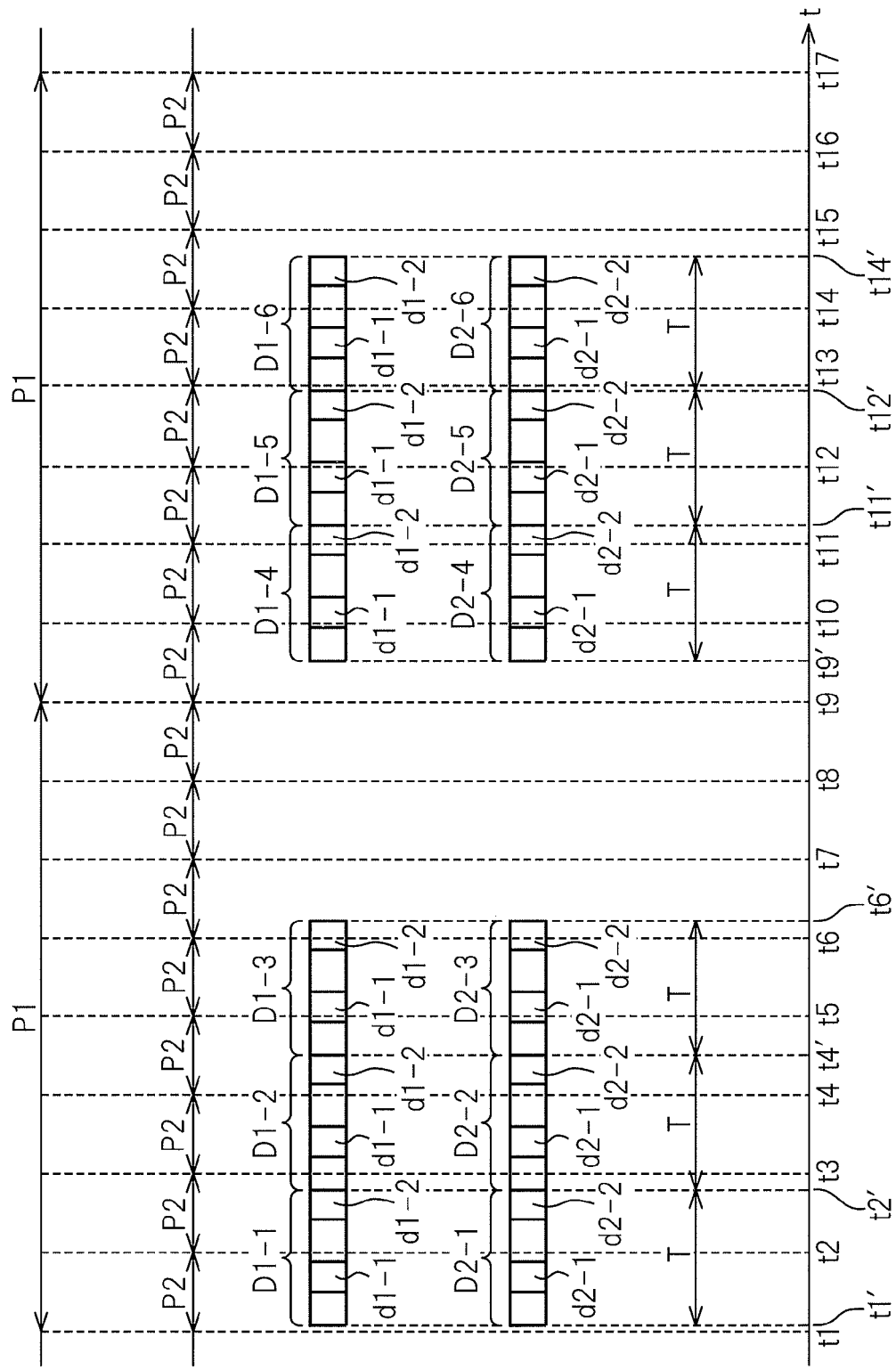
FIG. 2 is a diagram for explaining an operation of the data communication device in FIG. 1.

FIG. 2 is a diagram for explaining the operation of the data communication device in FIG. 1. In the example shown in FIG. 2, a serial communication period P1 is set to eight times a switching period P2, and times t1, t2, t3, . . . , t15, t16 and t17 are consistent with the starts of the switching periods P2, respectively. Further, the serial communication time setting unit 9e-1 sets a serial communication time T to a time less than half the serial communication period P1 and longer than the switching period P2. Furthermore, the serial communication time start setting unit 9e-2 sets the start of the serial communication time T of the data, which is transmitted by the data transmission unit 9f-1 at the data transmission of the second time or later, to an instant immediately after the end of the serial communication time T of the data transmitted immediately before the data transmission of the second time or later. Similarly, the serial communication time start setting unit 9e-2 sets the start of the serial communication time T of the data, which is received by the data reception unit 9f-2 at the data reception of the second time or later, to an instant immediately after the end of the serial communication time T of the data received immediately before the data reception of the second time or later.

Further, in the example shown in FIG. 2, the data transmission unit 9f-1 carries out the data transmission over the serial communication time T three times for each serial communication period P1, and switching noise resistant states d1-1 and d1-2 are set to the same part of the data, which is transmitted by the data transmission unit 9f-1, (the same place of the bit sequence which consists of 16 bits) in advance. Similarly, the data reception unit 9f-2 carries out the data reception over the serial communication time T three times for each serial communication period P1, and the switching noise resistant states d2-1 and d2-2 are set to the same part of the data, which is received by the data reception unit 9f-2, (the same place of the bit sequence which consists of 16 bits), in advance. Further, the data, which is transmitted by the data transmission unit 9f-1, has the same format as a format (the bit sequence which consists of 16 bits, for example) of the data, which is received by the data reception unit 9f-2. Further, the places where the switching noise resistant states d1-1 and d1-2 are set in the data, which is transmitted by the data transmission unit 9f-1, correspond to the places where the switching noise resistant states d2-1 and d2-2 are set in the data, which is received by the data reception unit 9f-2 (the fifth bit and the sixteenth bit of the bit sequence which consists of 16 bits, for example), respectively.

In the example shown in FIG. 2, the data transmission unit 9f-1 intends to transmit data D1-1, D1-2 and D1-3 to the inverter control devices 8-1, . . . , 8-k for any serial communication period P1, and to transmit data D1-4, D1-5, and D1-6 to the inverter control devices 8-1, . . . , 8-k for the next serial communication period P1.

There is a possibility that the start t2 of the switching period P2 within the serial communication time T from an instant t1' (t1<t1'<t2) to an instant t2' (t2<t2'<t3) during which the data D1-1 is transmitted is consistent with the transmission time of the switching noise nonresistant state. Consequently, in the case where an error of the data D1-1 is detected, the data transmission determination unit 9f-5 stops the transmission of the data D1-1 by the data transmission unit 9f-1, and causes the data transmission unit 9f-1 to transmit the data, which is stored in the data transmission determination unit 9f-5 and was transmitted by the data transmission unit 9f-1 the previous time. In contrast, in the case where an error of the data D1-1 is not detected, the data transmission determination unit 9f-5 causes the data transmission unit 9f-1 to transmit the data D1-1, and copy and temporary storage of the data D1-1 are carried out by the data transmission determination unit 9f-5.

There is a possibility that the starts t3 and t4 of the switching periods P2 within the serial communication time T from an instant t2' to an instant t4' (t4<t4'<t5) during which the data D1-2 is transmitted are consistent with the transmission time of the switching noise nonresistant state. Consequently, in the case where an error of the data D1-2 is detected, the data transmission determination unit 9f-5 stops the transmission of the data D1-2 by the data transmission unit 9f-1, and causes the data transmission unit 9f-1 to transmit the data (the data D1-1 in the case where there is no error in the data D1-1), which is stored in the data transmission determination unit 9f-5 and was transmitted by the data transmission unit 9f-1 the previous time. In contrast, in the case where an error of the data D1-2 is not detected, the data transmission determination unit 9f-5 causes the data transmission unit 9f-1 to transmit the data D1-2, and copy and temporary storage of the data D1-2 are carried out by the data transmission determination unit 9f-5.

The starts t5 and t6 of all of the switching periods P2 within the serial communication time T from the instant t4' to an instant t6' (t5<t6'<t6) during which the data D1-3 is transmitted are consistent with the transmission times of the switching noise resistant states d1-1 and d1-2, respectively. Consequently, the data D1-3 is not affected by switching noise. In this case, the data transmission determination unit 9f-5 causes the data transmission unit 9f-1 to transmit the data D1-3, and copy and temporary storage of the data D1-3 are carried out by the data transmission determination unit 9f-5.

The starts t10 and t11 of all of the switching periods P2 within the serial communication time T from an instant t9' (t9<t9'<t10) to an instant t11' (t11<t11'<t12) during which the data D1-4 is transmitted are consistent with the transmission times of the switching noise resistant states d1-1 and d1-2, respectively. Consequently, the data D1-4 is not affected by the switching noise. In this case, the data transmission determination unit 9f-5 causes the data transmission unit 9f-1 to transmit the data D1-4, and copy and temporary storage of the data D1-4 are carried out by the data transmission determination unit 9f-5.

The start t12 of all of the switching periods P2 within the serial communication time T from the instant t11' (t11<t11'<t12) to an instant t12' (t12<t12'<t13) during which the data D1-5 is transmitted is consistent with the transmission time of the switching noise resistant state d1-1. Consequently, the data D1-5 is not affected by the switching noise. In this case, the data transmission determination unit 9f-5 causes the data transmission unit 9f-1 to transmit the data D1-5, and copy and temporary storage of the data D1-5 are carried out by the data transmission determination unit 9f-5.

There is a possibility that the starts t13 and t14 of all of the switching periods P2 within the serial communication time T from the instant t12' to an instant t14' (t14<t14'<t15) during which the data D1-6 is transmitted are consistent with the transmission time of the switching noise nonresistant state. Consequently, in the case where an error of the data D1-6 is detected, the data transmission determination unit 9f-5 stops the transmission of the data D1-6 by the data transmission unit 9f-1, and causes the data transmission unit 9f-1 to transmit the data (the data D1-5 in this case), which is stored in the data transmission determination unit 9f-5 and was transmitted by the data transmission unit 9f-1 the previous time. In contrast, in the case where an error of the data D1-6 is not detected, the data transmission determination unit 9f-5 causes the data transmission unit 9f-1 to transmit the data D1-6, and copy and temporary storage of the data D1-6 are carried out by the data transmission determination unit 9f-5.

As described above, the data transmission unit 9f-1 transmits the data D1-3, which is not affected by the switching noise, to the inverter control devices 8-1, . . . , 8-k for any serial communication period P1, and the data transmission unit 9f-1 transmits the data D1-4 and D1-5, which are not affected by the switching noise, to the inverter control devices 8-1, . . . , 8-k for the next serial communication period P1.

Further, in the example shown in FIG. 2, the data reception unit 9f-2 receives data D2-1, D2-2 and D2-3 from the inverter control devices 8-1, . . . , 8-k for any serial communication period P1, and receives data D2-4, D2-5 and D2-6 from the inverter control devices 8-1, . . . , 8-k for the next serial communication period P1.

There is a possibility that the start t2 of the switching period P2 within the serial communication time T from the instant t1' to the instant t2' during which the data D2-1 is received is consistent with the reception time of the switching noise nonresistant state. Consequently, in the case where an error of the data D2-1 is detected, the data taking-in determination unit 9f-4 stops the taking-in of the data D2-1 to the converter control unit 9, i.e., the RAM 9c. In contrast, in the case where an error of the data D2-1 is not detected, the data taking-in determination unit 9f-4 takes in the data D2-1 to the converter control unit 9, i.e., the RAM 9c.

There is a possibility that the starts t3 and t4 of the switching periods P2 within the serial communication time T from the instant t2' to the instant t4' during which the data D2-2 is received are consistent with the reception time of the switching noise nonresistant state. Consequently, in the case where an error of the data D2-2 is detected, the data taking-in determination unit 9f-4 stops the taking-in of the data D2-2 to the RAM 9c. In contrast, in the case where an error of the data D2-2 is not detected, the data taking-in determination unit 9f-4 takes in the data D2-2 to the RAM 9c.

The starts t5 and t6 of all of the switching periods P2 within the serial communication time T from the instant t4' to the instant t6' during which the data D2-3 is received are consistent with the reception times of the switching noise resistant states d2-1 and d2-2, respectively. Consequently, the data D2-3 is not affected by the switching noise. In this case, the data taking-in determination unit 9f-4 takes in the data D2-3 to the RAM 9c.

The starts t10 and t11 of all of the switching periods P2 within the serial communication time T from the instant t9' to the instant t11' during which the data D2-4 is received are consistent with the reception times of the switching noise resistant states d2-1 and d2-2, respectively. Consequently, the data D2-4 is not affected by the switching noise. In this case, the data taking-in determination unit 9f-4 takes in the data D2-4 to the RAM 9c.

The start t12 of all of the switching periods P2 within the serial communication time T from the instant t11' to the instant t12' during which the data D2-5 is received is consistent with the reception times of the switching noise resistant states d2-1 and d2-2, respectively. Consequently, the data D2-5 is not affected by the switching noise. In this case, the data taking-in determination unit 9f-4 takes in the data D2-5 to the RAM 9c.

There is a possibility that the starts t13 and t14 of the switching periods P2 within the serial communication time T from the instant t12' to the instant t14' during which the data D2-6 is received are consistent with the reception time of the switching noise nonresistant state. Consequently, in the case where an error of the data D2-6 is detected, the data taking-in determination unit 9f-4 stops the taking-in of the data D2-6 to the RAM 9c. In contrast, in the case where an error of the data D2-6 is not detected, the data taking-in determination unit 9f-4 takes in the D2-6 to the RAM 9c.

As described above, the data reception unit 9f-1 receives the data D2-3, which is not affected by the switching noise, from the inverter control devices 8-1, . . . , 8-k for any serial communication period P1, and receives the data D2-4 and D2-5, which are not affected by the switching noise, from the inverter control devices 8-1, . . . , 8-k for the next serial communication period P1.

According to the example shown in FIG. 2, the starts of all of the switching periods P2 within the serial communication time T are consistent with the reception time of the switching noise resistant state at the time of at least one of the data transmissions (i.e., the transmission of the data D1-3 for any serial communication period P1 and the transmission of the data D1-4 and D1-5 for the next serial communication period P1) of the three times of the intended data transmissions for the serial communication period P1 (i.e., the transmission of the data D1-1, D1-2 and D1-3 for any serial communication period P1 and the transmission of the data D1-4, D1-5 and D1-6 for the next serial communication period P1). Because of this, it is possible to transmit the data, which is not affected by the switching noise, at least once for the serial communication period P1. Consequently, it is possible to avoid the influence of the switching noise without using a switching detection circuit when transmitting the data.

Further, the starts of all of the switching periods P2 within the serial communication time T are consistent with the reception time of the switching noise resistant state at the time of at least one of the data receptions (i.e., the reception of the data D2-3 for any serial communication period P1 and the reception of the data D2-4 and D2-5 for the next serial communication period P1) of the three times of the data receptions for the serial communication period P1 (i.e., the reception of the data D2-1, D2-2 and D2-3 for any serial communication period P1 and the reception of the data D2-4, D2-5 and D2-6 for the next serial communication period P1). Because of this, it is possible to receive the data, which is not affected by the switching noise, at least once for the serial communication period P1 and to take in the data to the converter control device 9. Consequently, it is possible to avoid the influence of the switching noise without using the switching detection circuit when receiving the data.

Figure 3:
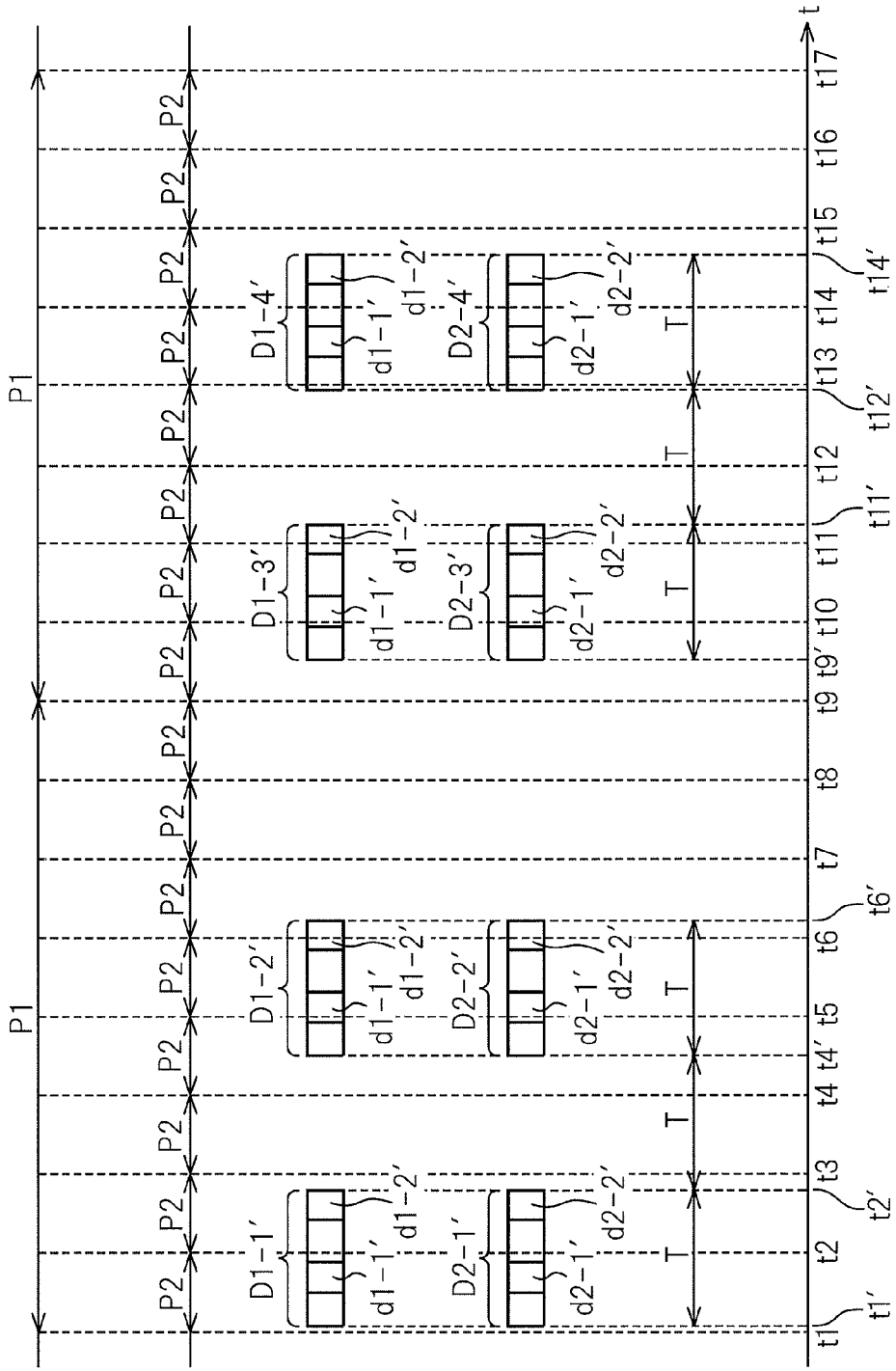
FIG. 3 is a diagram for explaining another operation of the data communication device in FIG. 1.

FIG. 3 is a diagram for explaining another operation of the data communication device in FIG. 1. In the example shown in FIG. 3, the serial communication period P1 is set to eight times the switching period P2, and the times t1, t2, t3, ..., t15, t16 and t17 are consistent with the starts of the switching periods P2, respectively. Further, the serial communication time setting unit 9e-1 sets the serial communication time T to a time less than ⅓ of the serial communication period P1 and longer than the switching period P2. Furthermore, the serial communication time start setting unit 9e-2 sets the start of the serial communication time T of the data, which is transmitted by the data transmission unit 9e-1 at the data transmission of the second time or later, to an instant immediately after an elapse of the time, which corresponds to the serial communication time T, from the end of the serial communication time T of the data transmitted immediately before the data transmission of the second time or later. Similarly, the serial communication time start setting unit 9e-2 sets the start of the serial communication time T of the data, which is received by the data reception unit 9e-2 at the data reception of the second time or later, to an instant immediately after an elapse of the time, which corresponds to the serial communication time T, from the end of the serial communication time T of the data received immediately before the data reception of the second time or later.

Further, in the example shown in FIG. 3, the data transmission unit 9f-1 carries out the data transmission over the serial communication time T twice for each serial communication period P1, and switching noise resistant states d1-1' and d1-2' are set to the same part of the data, which is transmitted by the data transmission unit 9f-1, (the same place of the bit sequence) in advance. Similarly, the data reception unit 9f-2 carries out the data reception over the serial communication time T twice for each serial communication period P1, and the switching noise resistant states d2-1' and d2-2' are set to the same part of the data, which is received by the data reception unit 9f-2, (the same place of the bit sequence) in advance. Further, the data, which is transmitted by the data transmission unit 9f-1, has the same format as a format (a bit sequence which consists of 16 bits, for example) of the data, which is received by the data reception unit 9f-2. Furthermore, the places where the switching noise resistant states d1-1' and d1-2' are set in the data, which is transmitted by the data transmission unit 9f-1, correspond to the places where the switching noise resistant states d2-1' and d2-2' are set in the data, which is received by the data reception unit 9f-2 (the fifth bit and the sixteenth bit of the bit sequence consisting of 16 bits, for example).

In the example shown in FIG. 3, the data transmission unit 9f-1 intends to transmit data D1-1' and D1-2' to the inverter control devices 8-1, ..., 8-k for any serial communication period P1, and to transmit data D1-3' and D1-4' to the inverter control devices 8-1, ..., 8-k for the next serial communication period P1.

There is a possibility that the start t2 of the switching period P2 within the serial communication time T from the instant t1' to the instant t2' during which the data D1-1' is transmitted is consistent with the transmission time of the switching noise nonresistant state. Consequently, in the case where an error of the data D1-1' is detected, the data transmission determination unit 9f-5 stops the transmission of the data D1-1' by the data transmission unit 9f-1, and causes the data transmission unit 9f-1 to transmit the data, which is stored in the data transmission determination unit 9f-5 and was transmitted by the data transmission unit 9f-1 the previous time. In contrast, in the case where an error of the data D1-1' is not detected, the data transmission determination unit 9f-5 causes the data transmission unit 9f-1 to transmit the data D1-1', and copy and temporary storage of the data D1-1' are carried out by the data transmission determination unit 9f-5.

The starts t5 and t6 of all of the switching periods P2 within the serial communication time T from the instant t4' to the instant t6' during which the data D1-2' is transmitted are consistent with the transmission times of the switching noise resistant states d1-1' and d1-2', respectively. Consequently, the data D1-2' is not affected by the switching noise. In this case, the data transmission determination unit 9f-5 causes the data transmission unit 9f-1 to transmit the data D1-2', and copy and temporary storage of the data D1-2' are carried out by the data transmission determination unit 9f-5.

The starts t10 and t11 of all of the switching periods P2 within the serial communication time T from the instant t9' to the instant t11' during which the data D1-3' is transmitted are consistent with the transmission times of the switching noise resistant states d1-1' and d1-2', respectively. Consequently, the data D1-3' is not affected by the switching noise. In this case, the data transmission determination unit 9f-5 causes the data transmission unit 9f-1 to transmit the data D1-3', and copy and temporary storage of the data D1-3' are carried out by the data transmission determination unit 9f-5.

There is a possibility that the starts t13 and t14 of all of the switching periods P2 within the serial communication time T from the instant t12' to the instant t14' during which the data D1-4' is transmitted are consistent with the transmission time of the switching noise nonresistant state. Consequently, in the case where an error of the data D1-4' is detected, the data transmission determination unit 9f-5 stops the transmission of the data D1-4' by the data transmission unit 9f-1 and causes the data transmission unit 9f-1 to transmit the data (the data D1-3' in this case), which is stored in the data transmission determination unit 9f-5 and was transmitted by the data transmission unit 9f-1 the previous time. In contrast, in the case where an error of the data D1-4' is not detected, the data transmission determination unit 9f-5 causes the data transmission unit 9f-1 to transmit the data D1-4', and copy and temporary storage of the data D1-4' are carried out by the data transmission determination unit 9f-5.

As described above, the data transmission unit 9f-1 transmits the data D1-2', which is not affected by the switching noise, to the inverter control devices 8-1, ..., 8-k for any serial communication period P1, and transmits the data D1-3', which is not affected by the switching noise, to the inverter control devices 8-1, . . . , 8-k for the next serial communication period P1.

Further, in the example shown in FIG. 3, the data reception unit 9f-2 receives data D2-1' and 2-2' from the inverter control devices 8-1, . . . , 8-k for any serial communication period P1, and receives data D2-3' and D2-4' from the inverter control devices 8-1, . . . , 8-k for the next serial communication period P1.

There is a possibility that the start t2 of the switching period P2 within the serial communication time T from the instant t1' to the instant t2' during which the data D2-1' is received is consistent with the reception time of the switching noise nonresistant state. Consequently, in the case where an error of the data D2-1' is detected, the data taking-in determination unit 9f-4 stops the taking-in of the data D2-1' to the RAM 9c. In contrast, in the case where an error of the data D2-1' is not detected, the data taking-in determination unit 9f-4 takes in the data D2-1' to the RAM 9c.

The starts t5 and t6 of all of the switching periods P2 within the serial communication time T from the instant t4' to the instant t6' during which the data D2-2' is received are consistent with the reception time of the switching noise resistant states d2-1' and d2-2', respectively. Consequently, the data D2-2' is not affected by the switching noise. In this case, the data taking-in determination unit 9f-4 takes in the data D2-2' to the RAM 9c.

The starts t10 and t11 of all of the switching periods P2 within the serial communication time T from the instant t9' to the instant t11 during which the data D2-3' is received are consistent with the reception times of the switching noise resistant states d2-1' and d2-2', respectively. Consequently, the data D2-3' is not affected by the switching noise. In this case, the data taking-in determination unit 9f-4 takes in the data D2-3' to the RAM 9c.

There is a possibility that the starts t13 and t14 of the switching periods P2 within the serial communication time T from the instant t12' to the instant t14' during which the data D2-4' is received are consistent with the reception time of the switching noise nonresistant state. Consequently, in the case where an error of the data D2-4' is detected, the data taking-in determination unit 9f-4 stops the taking-in of the data D2-4' to the RAM 9c. In contrast, in the case where an error of the data D2-4' is not detected, the data taking-in determination unit 9f-4 takes in the D2-4' to the RAM 9c.

As described above, the data reception unit 9f-1 receives the data D2-2', which is not affected by the switching noise, from the inverter control devices 8-1, . . . , 8-k, for any serial communication period P1, and receives the data D2-3', which is not affected by the switching noise, from the inverter control devices 8-1, . . . , 8-k for the next serial communication period P1.

According to the example shown in FIG. 3, the starts of all of the switching periods P2 within the serial communication time T are consistent with the reception time of the switching noise resistant state at the time of at least one of the data transmissions (i.e., the transmission of the data D1-2' for any serial communication period P1 and the transmission of the data D1-3' for the next serial communication period P1) of twice of the intended data transmissions for the serial communication period P1 (i.e., the transmission of the data D1-1' and D1-2' for any serial communication period P1 and the transmission of the data D1-3' and D1-4' for the next serial communication period P1). Because of this, it is possible to transmit the data, which is not affected by the switching noise, at least once for the serial communication period P1. Consequently, it is possible to avoid the influence of the switching noise without using the switching detection circuit when transmitting the data.

Further, the starts of all of the switching periods P2 within the serial communication time T are consistent with the reception time of the switching noise resistant state at the time of at least one of the data receptions (i.e., the reception of the data D2-2' for any serial communication period P1 and the reception of the data D2-3' for the next serial communication period P1) of twice of the data receptions for the serial communication period P1 (i.e., the reception of the data D2-1' and D2-2' for any serial communication period P1 and the reception of the data D2-3' and D2-4' for the next serial communication period P1). Because of this, it is possible to receive the data, which is not affected by the switching noise, at least once for the serial communication period P1 and to take in the received data, which is not affected by the switching noise, to the converter control device 9. Consequently, it is possible to avoid the influence of the switching noise without using the switching detection circuit when receiving the data.

Figure 4:
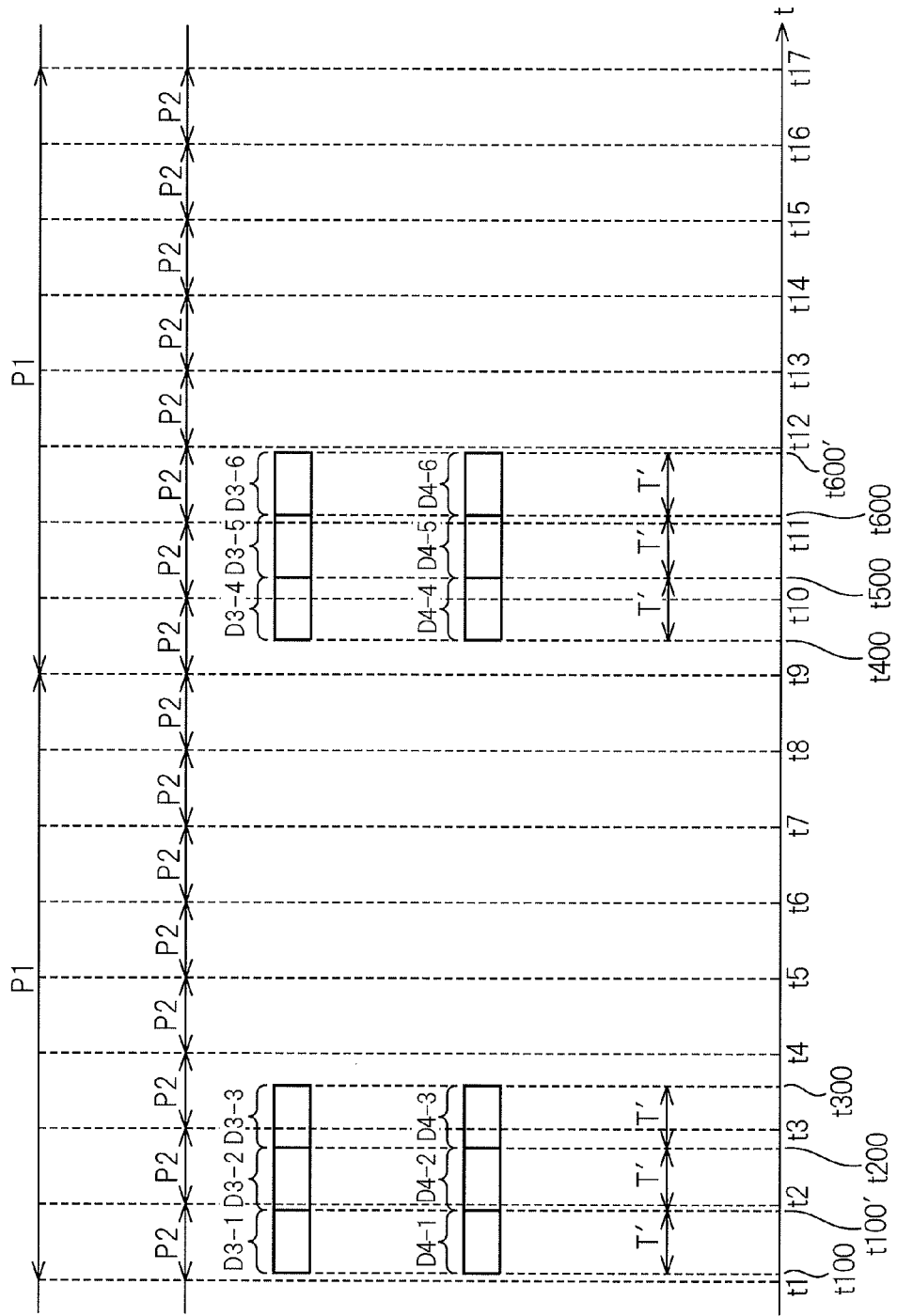
FIG. 4 is a diagram for explaining another operation of the data communication device in FIG. 1.

FIG. 4 is a diagram for explaining another operation of the data communication device in FIG. 1. In the example shown in FIG. 4, the serial communication period P1 is set to eight times the switching period P2, and the times t1, t2, t3, . . . , t15, t16 and t17 are consistent with the starts of the switching periods P2, respectively. Further, the serial communication time setting unit 9e-1 sets a serial communication time T' to a time less than half the serial communication period P1 and shorter than the switching period P2. Furthermore, the serial communication time start setting unit 9e-2 sets the start of the serial communication time T' of the data, which is transmitted by the data transmission unit 9e-1 at the data transmission of the second time or later, to an instant immediately after the end of the serial communication time T' of the data received immediately before the data transmission of the second time or later. Similarly, the serial communication time start setting unit 9e-2 sets the start of the serial communication time T' of the data, which is received by the data reception unit 9e-2 at the data reception of the second time or later, to an instant immediately after the end of the serial communication time T' of the data received immediately before the data reception of the second time or later.

Further, in the example shown in FIG. 4, the data transmission unit 9f-1 carries out the data transmission over the serial communication time T' three times for each serial communication period P1. Similarly, the data reception unit 9f-2 carries out the data reception over the serial communication time T' three times for each serial communication period P1. Further, the data, which is transmitted by the data transmission unit 9f-1, has the same format as a format (a bit sequence which consists of 16 bits, for example) of the data, which is received by the data reception unit 9f-2.

In the example shown in FIG. 4, the data transmission unit 9f-1 intends to transmit data D3-1, D3-2, and D3-3 to the inverter control devices 8-1, . . . , 8-k for any serial communication period P1, and to transmit data D3-4, D3-5, and D3-6 to the inverter control devices 8-1, . . . , 8-k for the next serial communication period P1.

A transmission start t100 of the data D3-1 is after the start t1 of the switching period P2 and a transmission end t100' of the data D3-1 is before the start t2 of the next switching period P2. Consequently, the data D3-1 is not affected by the switching noise. In this case, the data transmission determination unit 9f-5 causes the data transmission unit 9f-1 to transmit the data D3-1, and copy and temporary storage of the data D3-1 are carried out by the data transmission determination unit 9f-5.

The transmission start t100' of the data D3-2 is before the start t2 of the switching period P2 and a transmission end t200 of the data D3-2 is after the start t2 of the switching period P2. Because of this, there is a possibility that the start t2 of the switching period P2 within the serial communication time T' is consistent with the transmission time of the switching noise nonresistant state. Consequently, in the case where an error of the data D3-2 is detected, the data transmission determination unit 9f-5 stops the transmission of the data D3-2 by the data transmission unit 9f-1, and causes the data transmission unit 9f-1 to transmit the data (the data D3-1 in this case), which is stored in the data transmission determination unit 9f-5 and was transmitted by the data transmission unit 9f-1 the previous time. In contrast, in the case where an error of the data D3-2 is not detected, the data transmission determination unit 9f-5 causes the data transmission unit 9f-1 to transmit the data D3-2, and copy and temporary storage of the data D3-2 are carried out by the data transmission determination unit 9f-5.

The transmission start t200 of the data D3-3 is before the start t3 of the switching period P2 and a transmission end t300 of the data D3-3 is after the start t3 of the switching period P2. Because of this, there is a possibility that the start t3 of the switching period P2 within the serial communication time T' is consistent with the transmission time of the switching noise nonresistant state. Consequently, in the case where an error of the data D3-3 is detected, the data transmission determination unit 9f-5 stops the transmission of the data D3-3 by the data transmission unit 9f-1, and causes the data transmission unit 9f-1 to transmit the data (the data D3-2 in the case where no error of the data D3-2 is detected), which is stored in the data transmission determination unit 9f-5 and was transmitted by the data transmission unit 9f-1 the previous time. In contrast, in the case where an error of the data D3-3 is not detected, the data transmission determination unit 9f-5 causes the data transmission unit 9f-1 to transmit the data D3-3, and copy and temporary storage of the data D3-3 are carried out by the data transmission determination unit 9f-5.

A transmission start t400 of the data D3-4 is before the start t10 of the switching period P2 and a transmission end t500 of the data D3-4 is after the start t10 of the switching period P2. Because of this, there is a possibility that the start t10 of the switching period P2 within the serial communication time T' is consistent with the transmission time of the switching noise nonresistant state. Consequently, in the case where an error of the data D3-4 is detected, the data transmission determination unit 9f-5 stops the transmission of the data D3-4 by the data transmission unit 9f-1, and causes the data transmission unit 9f-1 to transmit the data (the data D3-3 in the case where no error of the data D3-3 is detected), which is stored in the data transmission determination unit 9f-5 and was transmitted by the data transmission unit 9f-1 the previous time. In contrast, in the case where an error of the data D3-4 is not detected, the data transmission determination unit 9f-5 causes the data transmission unit 9f-1 to transmit the data D3-4, and copy and temporary storage of the data D3-4 are carried out by the data transmission determination unit 9f-5.

The transmission start t500 of the data D3-5 is before the start t11 of the switching period P2 and a transmission end t600 of the data D3-5 is after the start t11 of the switching period P2. Because of this, there is a possibility that the start t11 of the switching period P2 within the serial communication time T' is consistent with the transmission time of the switching noise nonresistant state. Consequently, in the case where an error of the data D3-5 is detected, the data transmission determination unit 9f-5 stops the transmission of the data D3-5 by the data transmission unit 9f-1, and causes the data transmission unit 9f-1 to transmit the data (the data D3-4 in the case where no error of the data D3-4 is detected), which is stored in the data transmission determination unit 9f-5 and was transmitted by the data transmission unit 9f-1 the previous time. In contrast, in the case where an error of the data D3-5 is not detected, the data transmission determination unit 9f-5 causes the data transmission unit 9f-1 to transmit the data D3-5, and copy and temporary storage of the data D3-5 are carried out by the data transmission determination unit 9f-5.

The transmission start t600 of the data D3-6 is after the start t11 of the switching period P2 and a transmission end t600' of the data D3-6 is before the start t12 of the next switching period P2. Consequently, the data D3-6 is not affected by the switching noise. In this case, the data transmission determination unit 9f-5 causes the data transmission unit 9f-1 to transmit the data D3-6, and copy and temporary storage of the data D3-6 are carried out by the data transmission determination unit 9f-5.

As described above, the data transmission unit 9f-1 transmits the data D3-1, which is not affected by the switching noise, to the inverter control devices 8-1, ..., 8-k for any serial communication period P1, and transmits the data D3-6, which is not affected by the switching noise, to the inverter control devices 8-1, ..., 8-k for the next serial communication period P1.

Further, in the example shown in FIG. 4, the data reception unit 9f-2 receives data D4-1, D4-2 and D4-3 from the inverter control devices 8-1, ..., 8-k for any serial communication period P1, and receives data D4-4, D4-5 and D4-6 from the inverter control devices 8-1, ..., 8-k for the next serial communication period P1.

The reception start t100 of the data D4-1 is after the start t1 of the switching period P2 and the reception end t100' of the data D4-1 is before the start t2 of the next switching period P2. Consequently, the data D4-1 is not affected by the switching noise. In this case, the data taking-in determination unit 9f-4 takes in the data 4-1 to the RAM 9c.

The reception start t100' of the data D4-2 is before the start t2 of the switching period P2 and the reception end t200 of the data D4-2 is after the start t2 of the switching period P2. Because of this, there is a possibility that the start t2 of the switching period P2 within the serial communication time T' is consistent with the reception time of the switching noise nonresistant state. Consequently, in the case where an error of the data D4-2 is detected, the data taking-in determination unit 9f-4 stops the taking-in of the data D4-2 to the RAM 9c. In contrast, in the case where an error of the data D4-2 is not detected, the data taking-in determination unit 9f-4 takes in the data D4-2 to the RAM 9c.

The reception start t200 of the data D4-3 is before the start t3 of the switching period P2 and the reception end t300 of the data D4-3 is after the start t3 of the switching period P2. Because of this, there is a possibility that the start t3 of the switching period P2 within the serial communication time T' is consistent with the reception time of the switching noise nonresistant state. Consequently, in the case where an error of the data D4-3 is detected, the data taking-in determination unit 9f-4 stops the taking-in of the data D4-3 to the RAM 9c. In contrast, in the case where an error of the data D4-3 is not detected, the data taking-in determination unit 9f-4 takes in the data D4-3 to the RAM 9c.

The reception start t400 of the data D4-4 is before the start t10 of the switching period P2 and the reception end t500 of the data D4-4 is after the start t10 of the switching period P2. Because of this, there is a possibility that the start t10 of the switching period P2 within the serial communication time T' is consistent with the reception time of the switching noise nonresistant state. Consequently, in the case where an error of the data D4-4 is detected, the data taking-in determination unit 9f-4 stops the taking-in of the data D4-4 to the RAM 9c. In contrast, in the case where an error of the data D4-4 is not detected, the data taking-in determination unit 9f-4 takes in the data D4-4 to the RAM 9c.

The reception start t500 of the data D4-5 is before the start t11 of the switching period P2 and the reception end t600 of the data D4-5 is after the start t11 of the switching period P2. Because of this, there is a possibility that the start t11 of the switching period P2 within the serial communication time T' is consistent with the reception time of the switching noise nonresistant state. Consequently, in the case where an error of the data D4-5 is detected, the data taking-in determination unit 9f-4 stops the taking-in of the data D4-5 to the RAM 9c. In contrast, in the case where an error of the data D4-5 is not detected, the data taking-in determination unit 9f-4 takes in the data D4-5 to the RAM 9c.

The reception start t600 of the data D4-6 is after the start t11 of the switching period P2 and the reception end t600' of the data D4-6 is before the start t12 of the next switching period P2. Consequently, the data D4-6 is not affected by the switching noise. In this case, the data taking-in determination unit 9f-4 takes in the D4-6 to the RAM 9c.

As described above, the data reception unit 9f-2 receives the data D4-1, which is not affected by the switching noise, from the inverter control devices 8-1, . . . , 8-k for any serial communication period P1, and receives the data D4-6, which is not affected by the switching noise, from the inverter control devices 8-1, . . . , 8-k for the next serial communication period P1.

According to the example shown in FIG. 4, the start of the serial communication time T' is after the start of the switching period P2 and the end of the serial communication time T' is before the start of the next switching period P2 at the time of at least one of the data transmissions (i.e., the transmission of the data D3-1 for any serial communication period P1 and the transmission of the data D3-6 for the next serial communication period P1) of the three times of the intended data transmissions for the serial communication period P1 (i.e., the transmission of the data D3-1, D3-2 and D3-3 for any serial communication period P1 and the transmission of the data D3-4, D3-5 and D3-6 for the next serial communication period P1). Because of this, it is possible to transmit the data, which is not affected by the switching noise, at least once for the serial communication period P1. Consequently, it is possible to avoid the influence of the switching noise without using the switching detection circuit when transmitting the data.

Further, the start of the serial communication time T' is after the start of the switching period P2 and the end of the serial communication time T' is before the start of the next switching period P2 at the time of at least one of the data receptions (i.e., the reception of the data D4-1 for any serial communication period P1 and the reception of the data D4-6 for the next serial communication period P1) of the three times of the data receptions for the serial communication period P1 (i.e., the reception of the data D4-1, D4-2 and D4-3 for any serial communication period P1 and the reception of the data D4-4, D4-5 and D4-6 for the next serial communication period P1). Because of this, it is possible to receive the data, which is not affected by the switching noise, at least once for the serial communication period P1 and to take in the received data, which is not affected by the switching noise, to the converter control device 9. Consequently, it is possible to avoid the influence of the switching noise without using the switching detection circuit when receiving the data.

Figure 5:
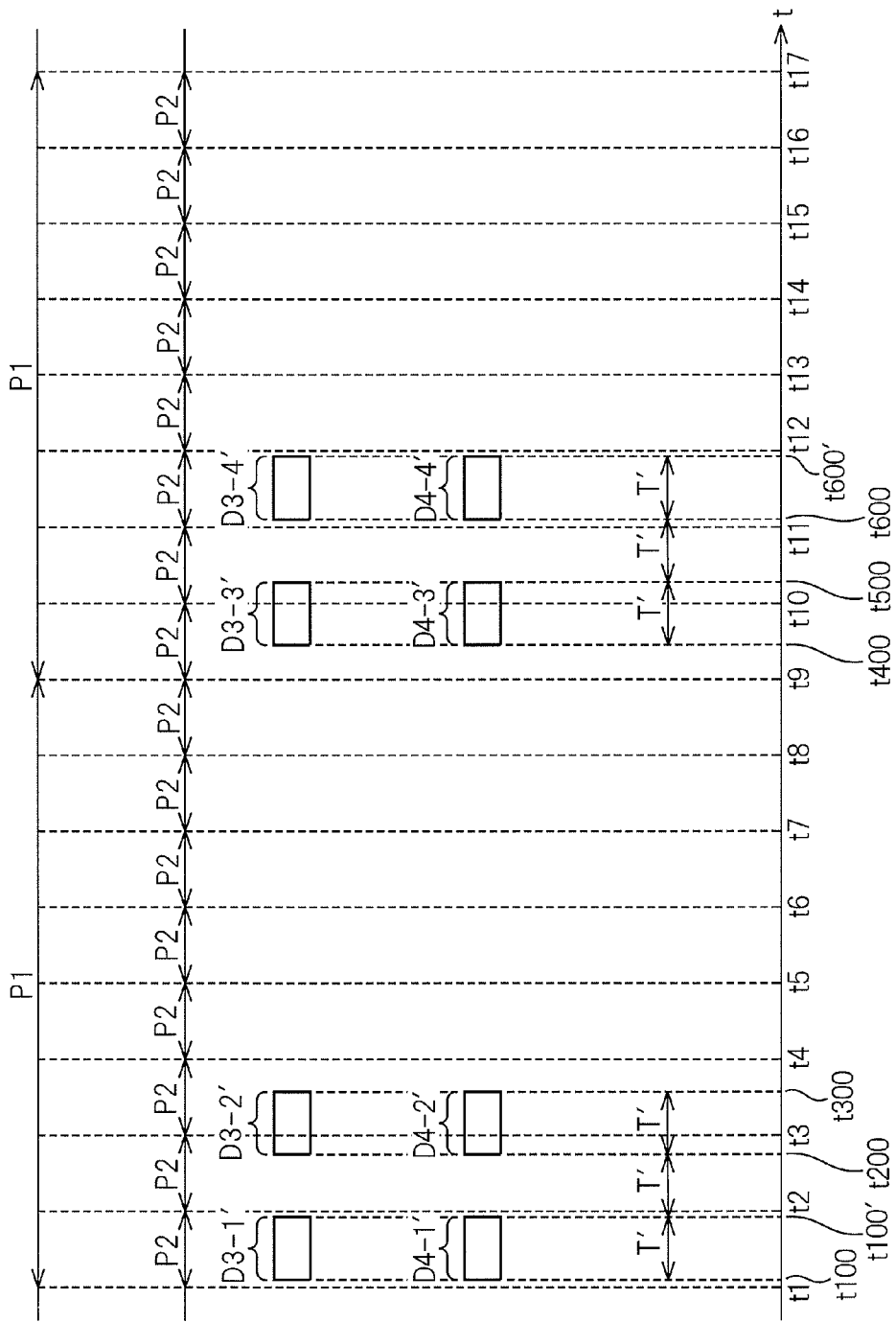
FIG. 5 is a diagram for explaining another operation of the data communication device in FIG. 1.

FIG. 5 is a diagram for explaining another operation of the data communication device in FIG. 1. In the example shown in FIG. 5, the serial communication period P1 is set to eight times the switching period P2, and the times t1, t2, t3, . . . , t15, t16 and t17 are consistent with the starts of the switching periods P2, respectively. Further, the serial communication time setting unit 9e-1 sets the serial communication time T' to a time less than ⅓ of the serial communication period P1 and shorter than the switching period P2. Furthermore, the serial communication time start setting unit 9e-2 sets the start of the serial communication time T' of the data, which is transmitted by the data transmission unit 9e-1, at the data transmission of the second time or later, to an instant immediately after the elapse of the time, which corresponds to the serial communication time T', from the end of the serial communication time T' of the data received immediately before the data transmission of the second time or later. Similarly, the serial communication time start setting unit 9e-2 sets the start of the serial communication time T' of the data, which is received by the data reception unit 9e-2 at the data reception of the second time or later, to an instant immediately after the elapse of the time, which corresponds to the serial communication time T', from the end of the serial communication time T' of the data received immediately before the data reception of the second time or later.

Further, in the example shown in FIG. 5, the data transmission unit 9f-1 carries out the data transmission over the serial communication time T' twice for each serial communication period P1. Similarly, the data reception unit 9f-2 carries out the data reception over the serial communication time T' twice for each serial communication period P1. Further, the data, which is transmitted by the data transmission unit 9f-1, has the same format as a format (a bit sequence which consists of 16 bits, for example) of the data, which is received by the data reception unit 9f-2.

In the example shown in FIG. 5, the data transmission unit 9f-1 intends to transmit data D3-1' and D3-2' to the inverter control devices 8-1, . . . , 8-k for any serial communication period P1, and to transmit data D3-3' and D3-4' to the inverter control devices 8-1, . . . , 8-k for the next serial communication period P1.

The transmission start t100 of the data D3-1' is after the start t1 of the switching period P2 and the transmission end t100' of the data D3-1' is before the start t2 of the next switching period P2. Consequently, the data D3-1' is not affected by the switching noise. In this case, the data transmission determination unit 9f-5 causes the data transmission unit 9f-1 to transmit the data D3-1', and copy and temporary storage of the data D3-1' are carried out by the data transmission determination 9f-5.

The transmission start t200 of the data D3-2' is before the start t3 of the switching period P2 and the transmission end t300 of the data D3-2' is after the start t3 of the switching period P2. Because of this, there is a possibility that the start t3 of the switching period P2 within the serial communication time T' is consistent with the transmission time of the switching noise nonresistant state. Consequently, in the case where an error of the data D3-2' is detected, the data transmission determination unit 9f-5 stops the transmission of the data D3-2' by the data transmission unit 9f-1, and causes the data transmission unit 9f-1 to transmit the data (the data D3-1' in this case), which is stored in the data transmission determination unit 9f-5 and was transmitted by the data transmission unit 9f-1 the previous time. In contrast, in the case where an error of the data D3-2' is not detected, the data transmission determination unit 9f-5 causes the data transmission unit 9f-1 to transmit the data D3-2', and copy and temporary storage of the data D3-2' are carried out by the data transmission determination 9f-5.

The transmission start t400 of the data D3-3' is before the start t10 of the switching period P2 and the transmission end t500 of the data D3-3' is after the start t10 of the switching period P2. Because of this, there is a possibility that the start t10 of the switching period P2 within the serial communication time T' is consistent with the transmission time of the switching noise nonresistant state. Consequently, in the case where an error of the data D3-3' is detected, the data transmission determination unit 9f-5 stops the transmission of the data D3-3' by the data transmission unit 9f-1, and causes the data transmission unit 9f-1 to transmit the data (the data D3-3' in the case where no error of the data D3-3' is detected), which is stored in the data transmission determination unit 9f-5 and was transmitted by the data transmission unit 9f-1 the previous time. In contrast, in the case where an error of the data D3-3' is not detected, the data transmission determination unit 9f-5 causes the data transmission unit 9f-1 to transmit the data D3-3', and copy and temporary storage of the data D3-3' are carried out by the data transmission determination 9f-5.

The transmission start t600 of the data D3-4' is after the start t11 of the switching period P2 and the transmission end t600' of the data D3-4' is before the start t12 of the next switching period P2. Consequently, the data D3-4' is not affected by the switching noise. In this case, the data transmission determination unit 9f-5 causes the data transmission unit 9f-1 to transmit the data D3-4', and copy and temporary storage of the data D3-4' are carried out by the data transmission determination 9f-5.

As described above, the data transmission unit 9f-1 transmits the data D3-1', which is not affected by the switching noise, to the inverter control devices 8-1, ..., 8-k for any serial communication period P1, and transmits the data D3-4', which is not affected by the switching noise, to the inverter control devices 8-1, ..., 8-k for the next serial communication period P1.

Further, in the example shown in FIG. 5, the data reception unit 9f-2 receives data D4-1' and D4-2' from the inverter control devices 8-1, ..., 8-k for any serial communication period P1, and receives data D4-3' and D4-4' from the inverter control devices 8-1, ..., 8-k for the next serial communication period P1.

The reception start t100 of the data D4-1' is after the start t1 of the switching period P2 and the reception end t100' of the data D4-1' is before the start t2 of the next switching period P2. Consequently, the data D4-1' is not affected by the switching noise. In this case, the data taking-in determination unit 9f-4 takes in the data 4-1' to the RAM 9c.

The reception start t200 of the data D4-2' is before the start t3 of the switching period P2 and the reception end t300 of the data D4-2' is after the start t3 of the switching period P2. Because of this, there is a possibility that the start t3 of the switching period P2 within the serial communication time T' is consistent with the reception time of the switching noise nonresistant state. Consequently, in the case where an error of the data D4-2' is detected, the data taking-in determination unit 9f-4 stops the taking-in of the data D4-2' to the RAM 9c. In contrast, in the case where an error of the data D4-2' is not detected, the data taking-in determination unit 9f-4 takes in the data D4-2' to the RAM 9c.

The reception start t400 of the data D4-3' is before the start t10 of the switching period P2 and the reception end t500 of the data D4-3' is after the start t10 of the switching period P2. Because of this, there is a possibility that the start t10 of the switching period P2 within the serial communication time T' is consistent with the reception time of the switching noise nonresistant state. Consequently, in the case where an error of the data D4-3' is detected, the data taking-in determination unit 9f-4 stops the taking-in of the data D4-3' to the RAM 9c. In contrast, in the case where an error of the data D4-3' is not detected, the data taking-in determination unit 9f-4 takes in the data D4-3' to the RAM 9c.

The reception start t600 of the data D4-4' is after the start t11 of the switching period P2 and the reception end t600' of the data D4-4' is before the start t12 of the switching period P2. Because of this, the data D4-4' is not affected by the switching noise. In this case, the data taking-in determination unit 9f-4 takes in the data D4-4' to the RAM 9c.

As described above, the data reception unit 9f-2 receives the data D4-1', which is not affected by the switching noise, from the inverter control devices 8-1, ..., 8-k for any serial communication period P1, and receives the data D4-4', which is not affected by the switching noise, from the inverter control devices 8-1, ..., 8-k for the next serial communication period P1.

According to the example shown in FIG. 5, the start of the serial communication time T' is after the start of the switching period P2 and the end of the serial communication time T' is before the start of the next switching period P2 at the time of at least one of the data transmissions (i.e., the transmission of the data D3-1' for any serial communication period P1 and the transmission of the data D3-4' for the next serial communication period P1) of twice of the intended data transmission for the serial communication period P1 (i.e., the transmission of the data D3-1' and D3-2' for any serial communication period P1 and the transmission of the data D3-3' and D3-4' for the next serial communication period P1). Because of this, it is possible to transmit the data, which is not affected by the switching noise, at least once for the serial communication period P1. Consequently, it is possible to avoid the influence of the switching noise without using the switching detection circuit when transmitting data.

Further, the start of the serial communication time T' is after the start of the switching period P2 and the end of the serial communication time T' is before the start of the next switching period P2 at the time of at least one of the data receptions (i.e., the reception of the data D4-1' for any serial communication period P1 and the reception of the data D4-4' for the next serial communication period P1) of twice of the data reception for the serial communication period P1 (i.e., the reception of the data D4-1' and D4-2' for any serial communication period P1 and the reception of the data D4-3' and D4-4' for the next serial communication period P1). Because of this, it is possible to receive the data, which is not affected by the switching noise, at least once for the serial communication period P1, and to take in the received data, which is not affected by the switching noise, to the converter control device 9. Consequently, it is possible to avoid the influence of switching noise without using the switching detection circuit when receiving the data.

Figure 6:
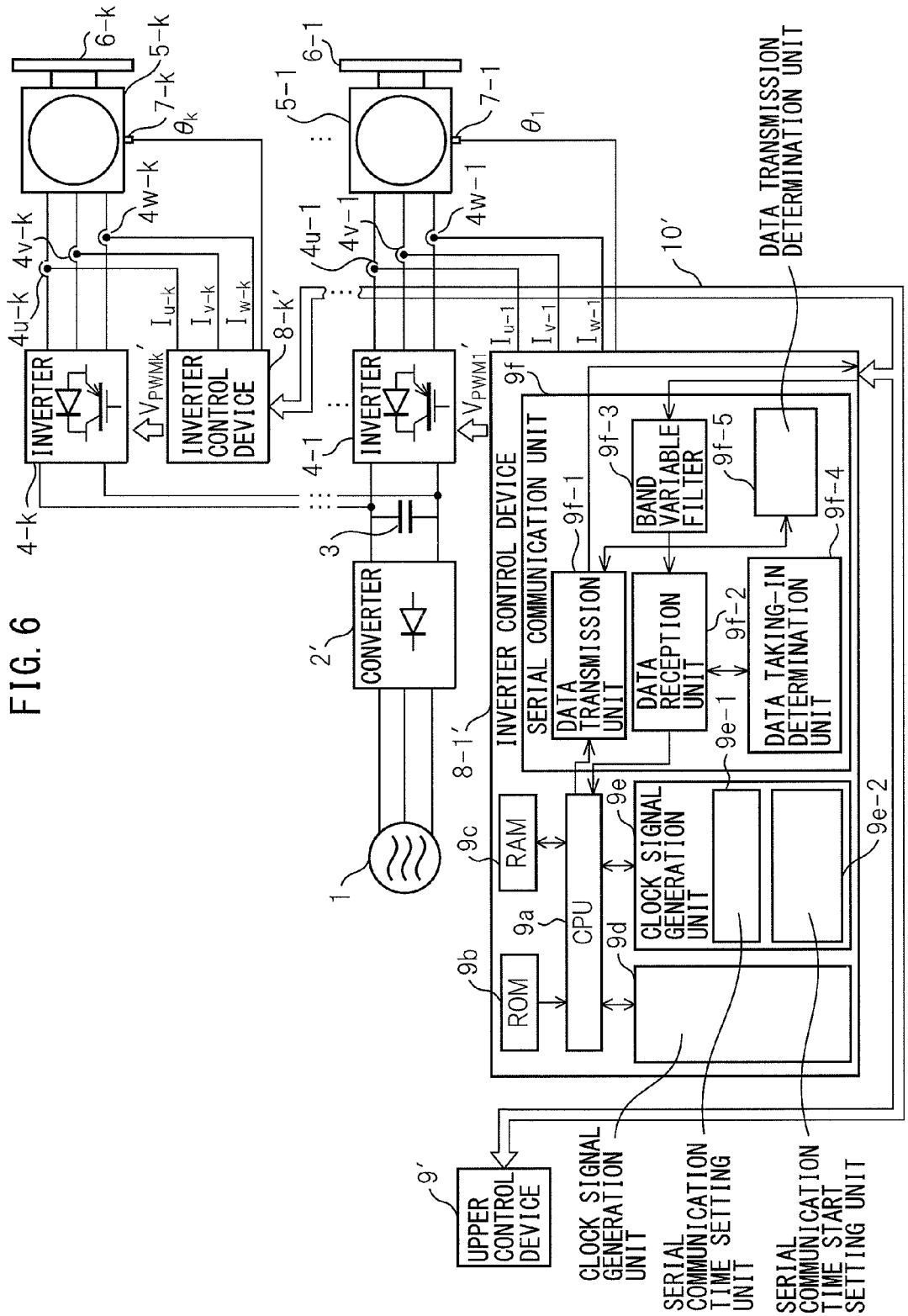
FIG. 6 is a block diagram of another system to which the data communication device according to the present invention is applied in order to control motors.

FIG. 6 is a block diagram of another system to which the data communication device according to the present invention is applied in order to control motors. In the system shown in FIG. 6, in place of the converter control device 9 in FIG. 1, an upper control device 9' is used as the master device, and in place of the reactors 1u, 1v, and 1w, and the converter 2 in FIG. 1, a converter 2', which consists of a plurality of rectifier diodes, is arranged between the three-phase alternating-current power source 1 and the smoothing capacitor 3, and in place of the inverter control devices 8-1, ..., 8-k in FIG. 1, inverter control devices 8-1', ..., 8-k' as the slave device, which corresponds to the data communication device according to the present invention, are arranged.

The inverter control devices 8-1', ..., 8-k' have the CPU 9a, the ROM 9b, the RAM 9c, the clock signal generation unit 9d, the clock signal generation unit 9e, and the serial communication unit 9f, respectively, however, in the system shown in FIG. 6, the CPU 9a, the ROM 9b, the RAM 9c, the clock signal generation unit 9d, the clock signal generation unit 9e, and the serial communication unit 9f within the inverter control devices 8-2', ..., 8-k' are omitted. Further, the inverter control devices 8-1', ..., 8-k' generate PWM signals $V_{PWM1}'$ ..., $V_{PWMk}'$, respectively, to drive the motors 5-1, ..., 5-k, based on current value data and motor position or speed data, which are sampled, and motor position or speed command data, which is provided from the upper control device 9'.

The upper control device 9' transmits data such as the motor position or speed command data to the inverter control devices 8-1', ..., 8-k' via a serial communication bus 10', and receives data such as the current value data and motor position or speed data from the inverter control devices 8-1', ..., 8-k' via the serial communication bus 10'.

Figure 7:
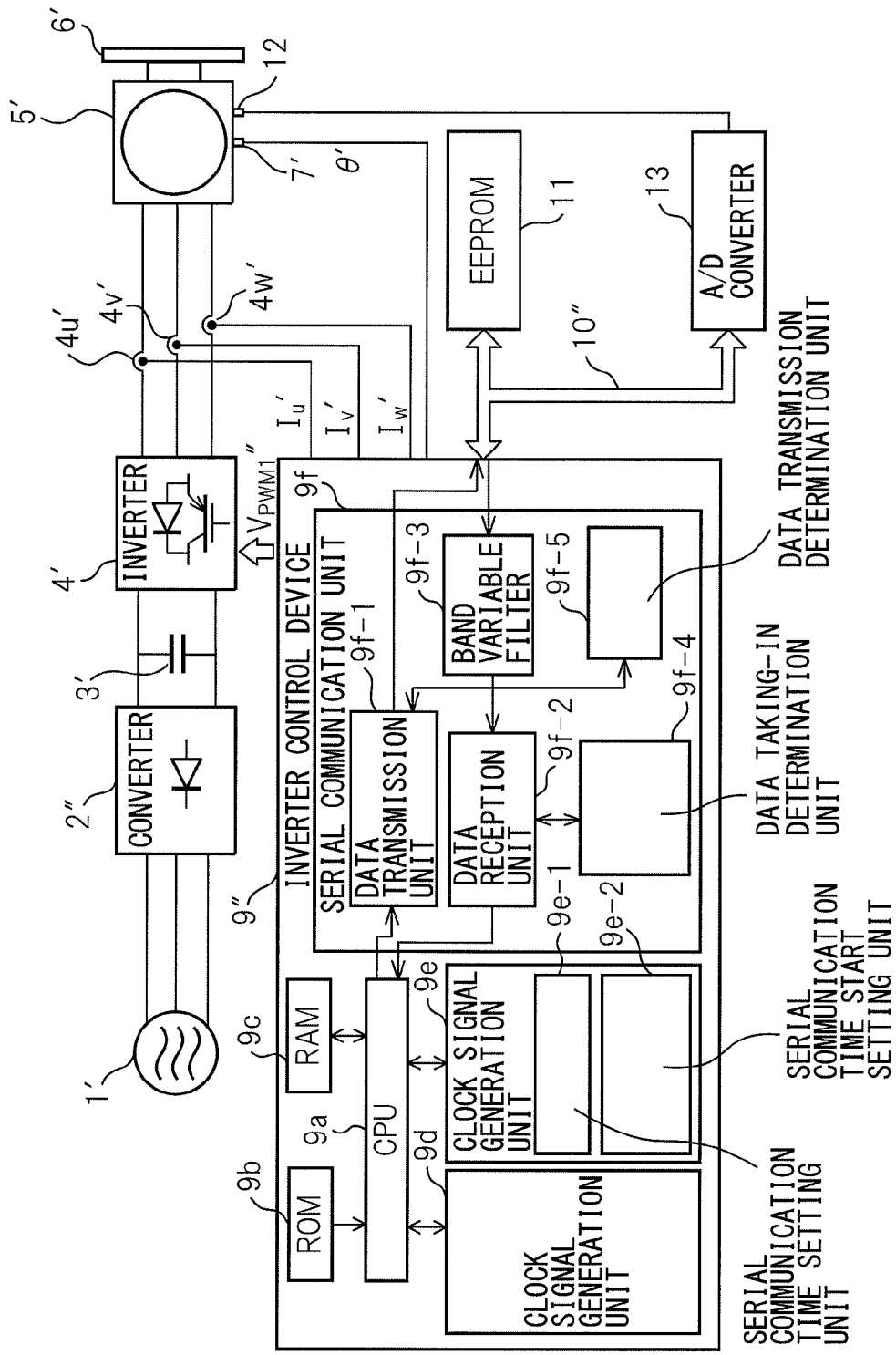
FIG. 7 is a block diagram of anther system to which the data communication device according to the present invention is applied in order to control motors.

FIG. 7 is a block diagram of another system to which the data communication device according to the present invention is applied in order to control motors. The system shown in FIG. 7 has a three-phase alternating-current power source 1', a converter 2", a smoothing capacitor 3', an inverter 4', a motor 5', a driven object 6', a rotation angle detection unit 7', an inverter control device 9" as the master device, an EEPROM 11 as the slave device, an A/D converter 11 as a slave device connected to a temperature sensor 12, and a serial communication bus 10".

The three-phase alternating-current power source 1', the converter 2", and the smoothing capacitor 3' correspond to the three-phase alternating-current power source 1 in FIG. 1 or FIG. 6, the converter 2' in FIG. 6, and the smoothing capacitor 3 in FIG. 1 or FIG. 6, respectively. Current detection units 4u'; 4v'; 4w' correspond to one of the current detection units 4u-1; 4v-1; 4w-1, 4u-k; 4v-k; 4w-k in FIG. 1 or FIG. 6, respectively. The motor 5' corresponds to one of the motors 5-1, ..., 5-k in FIG. 1 or FIG. 6. The driven object 6' corresponds to one of the driven objects 6-1, ..., 6-k. The rotation angle detection unit 7' corresponds to one of the rotation angle detection units 7-1, ..., 7-k in FIG. 1 or FIG. 6. The inverter control device 9" corresponds to one of the inverter control devices 8-1, ..., 8-k shown in FIG. 1. In the EEPROM 11, various kinds of data acquired before the inverter control device 9" is activated are stored. The temperature sensor 12 detects the temperature of the motor, which corresponds to one of the motors 5-1, ..., 5-k shown in FIG. 1 or FIG. 6. The serial communication bus 10" is used to carry out data transmission and reception of data between the inverter control device 9" and the EEPROM 11 and between the inverter control device 9" and the A/D converter 13. A U-phase current $I_U'$, a V-phase current $I_V'$ and a W-phase current $I_W'$ correspond to one of the U-phase currents $I_{U-1}$, ..., $I_{U-k}$, the V-phase currents $I_{V-1}$, ..., $I_{V-k}$, and the W-phase currents $I_{W-1}$, ..., $I_{W-k}$ in FIG. 1 or FIG. 6, respectively. A rotation angle $\theta'$ corresponds to one of the rotation angles $\theta_1$, ..., $\theta_n$ in FIG. 1 or FIG. 6.

The inverter control device 9" has the CPU 9a, the ROM 9b, the RAM 9c, the clock signal generation unit 9d, the clock signal generation unit 9e, and the serial communication unit 9f and generates a PWM signal $V_{PWM}"$, which corresponds to any one of the PWM signals $V_{PWM1}$ ..., $V_{PWMk}$. Further, the inverter control device 9" transmits data such as a command to read data stored in the EEPROM 11 and a calculation result of the CPU 11a, etc., to the EEPROM 11 via the serial communication bus 10", and receives data stored in the EEPROM 11 from the EEPROM 11 via the serial communication bus 10". Furthermore, the inverter control device 9" transmits data such as a command to read temperature data obtained by subjecting analog data of temperature acquired by the temperature sensor 13 to A/D conversion, to the A/D converter 13 via the serial communication bus 10" and receives data, which is acquired by the A/D converter 13, from the A/D converter 13 via the serial communication bus 10".

The present invention is not limited to the above-mentioned embodiments and there can be a variety of alterations and modifications. For example, it is possible to use the data communication device according to the present invention in a machine other than a machine tool, an industrial robot, etc. Further, it is possible to implement the master device by a device other than the converter control device 9, the upper control device 9', and the inverter control device 9", and to implement the slave device by a device other than the inverter control devices 8-1, ..., 8-k and 8-1', ..., 8-k', the EEPROM 11, and the A/D converter 13. Further, it is also possible to use RS422 serial communication, etc., as serial communication.

In the system shown in FIG. 1 and FIG. 6, as an alternating-current power source, the three-phase alternating-current power source 1 is used, however, it is also possible to use a multi-phase alternating-current power source other than the three-phase alternating-current power source as an alternating-current power source. Further, it is possible to constitute the rotation angle detection units 7-1, ..., 7-k by a part (for example, hole element or resolver) other than the rotary encoder. Further, it may also be possible to detect only two phases of currents (for example, U-phase current and V-phase current) of the U-phase current, the V-phase current, and the W-phase current instead of detecting all of the U-phase current, the V-phase current, and the W-phase current.

Furthermore, the case where the converter control device 9', the inverter control device 9" or the inverter control devices 8-1, ..., 8-k and 8-1', ..., 8-k', which correspond to the data communication device, have both the data taking-in determination unit 9f-4 and the data transmission determination unit 9f-5, is explained, however, it is sufficient for the converter control device 9', the inverter control device 9" or the inverter control devices 8-1, ..., 8-k and 8-1', ..., 8-k' to have any one of the data taking-in determination unit 9f-4 and the data transmission determination unit 9f-5.

Further, in the examples shown in FIG. 4 and FIG. 5, the case where the start of the serial communication time T' is set to the instant immediately after the elapse of the time, which corresponds to the serial communication time T', from the end of the serial communication time T' of the data received immediately therebefore, is explained, however, it may also be possible to set the start of the serial communication time T' to an instant immediately after an elapse of the time, which corresponds to a multiple of intervals of the serial communication time T', from the end of the serial communication time T' of the data received immediately therebefore.

As above, the present invention is explained in relation to the preferred embodiments thereof, however, it should be understood by a person skilled in the art that various alterations and modifications can be made without deviating from the scope disclosed by the claims.

The invention claimed is:

1. A data communication device that carries out serial communication in order to control a motor, which is connected via an inverter to a DC link part connected to an alternating-current power source via a converter, by carrying out switching of a switching element included in either the converter or the inverter for each fixed switching period, from the time when the preparation of driving the motor is completed to the time when the motor is stopped, comprising:

a data transmission unit configured to carry out transmission of first data, which consists of a combination of a first number of switching noise resistant states and a second number of switching noise nonresistant states, over a fixed serial communication time at least once for each fixed serial communication period same as the one or a plurality of the switching periods;

a data reception unit configured to carry out reception of second data, which consists of a combination of a third number of switching noise resistant states and a fourth number of switching noise nonresistant states, over the fixed serial communication time a plurality of times for each fixed serial communication period;

a serial communication time setting unit configured to set the serial communication time different from the time, which is the same as one or a plurality of the switching periods, based on the switching period, the serial communication period, and the communication speed of the data communication device, so that the start of the serial communication time is after the start of the switching period and the end of the serial communication time is before the start of the next switching period or so that the starts of all of the switching periods within the serial communication time are consistent with the time of reception of the switching noise resistant state at the time of at least one of the reception of the second data among a plurality of times of the reception of the second data;

and a data taking-in determination unit configured to determine which of a plurality of pieces of the second data received by the data reception unit is to be taken into the data communication device, based on the influence of the switching noise on the second data.

2. The data communication device according to claim 1, wherein the serial communication time setting unit sets the serial communication time to a time less than half the serial communication period; and the data communication device further comprises a serial communication time start setting unit configured to set the start of the serial communication time of the second data, which is received by the data reception unit at the reception of the second data of a second time or later among the plurality of receptions of second data, immediately after the end of the serial communication time of the second data received immediately before the reception of the second data of the second time or later.

3. The data communication device according to claim 1, wherein the serial communication time setting unit sets the serial communication time to a time less than $1/3$ of the serial communication period; and the data communication device further comprises a serial communication time start setting unit configured to set the start of the serial communication time of the second data, which is received by the data reception unit at the reception of the second data of a second time or later among the plurality of receptions of the second data, immediately after an elapse of the time, which corresponds to one or more intervals of the serial communication times, from the end of the serial communication time of the second data received immediately before the reception of the second data of the second time or later.

4. The data communication device according to claim 1, further comprising a data transmission determination unit configured to determine whether or not to transmit the first data based on the influence of switching noise on the first data.

* * * * *